United States Patent [19]

Hodgetts

[11] 4,028,791

[45] June 14, 1977

[54] KEG HANDLING APPARATUS AND METHOD

[75] Inventor: Ernest J. Hodgetts, Spruce Grove, Canada

[73] Assignee: The Molson Companies Limited, Spruce Grove, Canada

[22] Filed: Aug. 10, 1976

[21] Appl. No.: 713,118

[30] Foreign Application Priority Data

May 13, 1976 Canada ............................... 252504

[52] U.S. Cl. .................................. 29/427; 29/822; 53/381 A
[51] Int. Cl.² ......................................... B23P 19/02
[58] Field of Search ................ 29/426, 427, 208 B, 29/208 R, 200 A, 200 D, 200 R; 113/1 K; 53/381 A; 198/603

[56] References Cited

UNITED STATES PATENTS

| | | | |
|---|---|---|---|
| 2,772,022 | 11/1956 | Menning et al. | 198/603 X |
| 2,799,384 | 7/1957 | Rutherford | 198/603 X |
| 3,111,913 | 11/1963 | Mladek et al. | 198/603 X |
| 3,174,650 | 3/1965 | Bellato | 408/67 |
| 3,243,936 | 4/1966 | Anderson | 53/381 A |
| 3,613,332 | 10/1971 | Davis | 53/381 A |
| 3,906,610 | 9/1975 | Hodgetts | 29/208 B |

*Primary Examiner*—James R. Duzan
*Attorney, Agent, or Firm*—Anthony J. Casella; Joseph A. Calvaruso

[57] ABSTRACT

The invention relates to apparatus and a method of conveying, orienting, transferring and debunging empty beverage kegs. The apparatus includes a keg elevator for raising the kegs to the uppermost of a series of superposed endless conveyor belts. The tension of the latter is such that, where they face one another, they engage the periphery of each keg and urge it along the path of travel.

6 Claims, 2 Drawing Figures

KEG HANDLING APPARATUS AND METHOD

This invention relates to apparatus and a method of conveying, orienting, transferring and de-bunging beverage kegs.

The invention is particularly suitable for handling empty aluminum beer kegs returned to a brewery for sterilization and refilling and for transporting them from a reception area to first means capable of receiving said kegs in either inverted or obverse condition and which will (a) automatically sense and remove the disc normally found on one end of the keg and serving to identify the particular type of beer and the brewery and (b) orienting the kegs so that they will all face the same direction in a longitudinal plane prior to transferring them to second means which will remove the filling bung located in the side of each keg, said kegs thereafter being transferred to sterilizing apparatus.

Heretofore, the empty kegs are received at the brewery and must be manually transferred to a position where the identifying tabs are removed by hand. Such kegs must then again be manhandled to another location where the bungs in the side of the kegs are removed and then manhandled to sterilizing apparatus. At the barest minimum, each shift consists of four men. Hence, the saving in labour and time costs effected by the present invention is of some magnitude and this is extremely important when considering the present inflationary spiral.

It is already known to provide apparatus adapted to remove the discs (see copending U.S. application Ser. No. 713,117 filed Aug. 10, 1976) and apparatus is already known for removing the bungs (see U.S. Pat. No. 3,906,610 issued Sept. 23, 1975) both the said application as well as the said patent emanating from the present inventor.

The invention is illustrated, by way of example, in the accompanying drawings in which.

Figure 1:
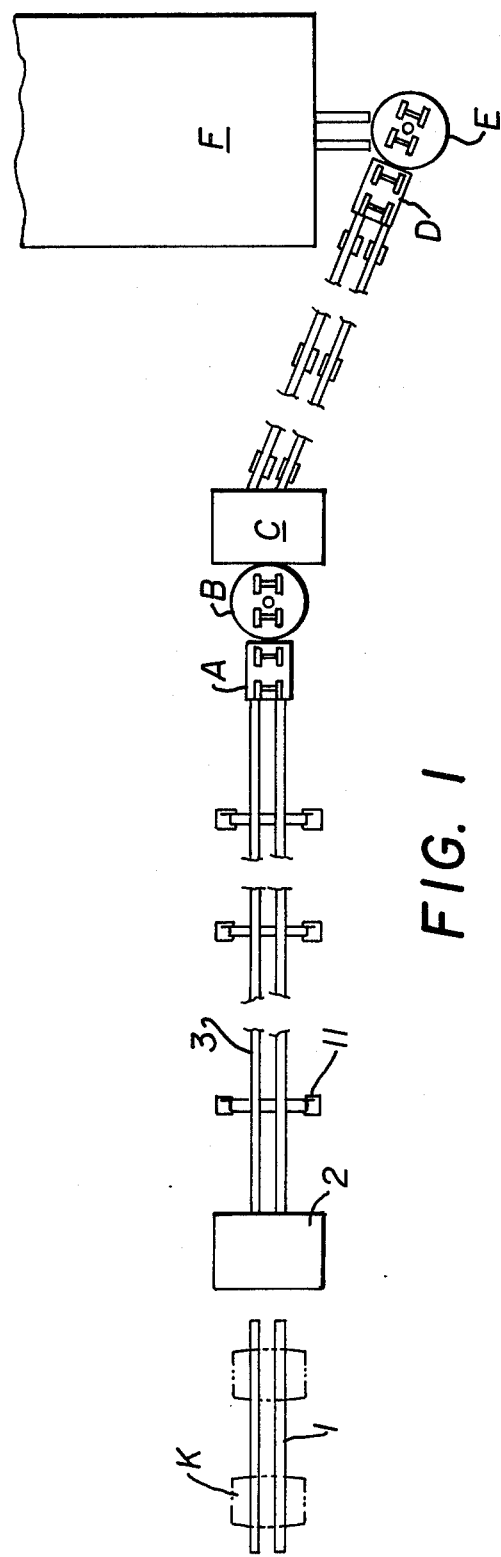
FIG. 1 is a diagrammatic plan view of a keg handling line in a brewery.

Referring to the drawings, empty aluminum beer kegs, K, still bearing the usual plastic disc, identifying the brewer and the type of beer i.e. lager or ale, on the outer end of each tapping spigot, as well as the usual wooden filling bung in the sides, are deposited by truck on to a horizontal conveyor 1 leading from the yard into the keg house where a vertical keg-elevator 2 is located which will lift said kegs vertically upward to a position where they will be deposited on to the terminal end of an upper horizontal conveyor 3. The conveyor 3 is constituted by an endless belt which passes over drive rollers 4 (FIG. 2) located at either end. Located at the distal end of the upper conveyor 3, but spaced therefrom, is a vertical deflector 5 which, when a keg reaches said distal end and drops from the conveyor, will deflect the keg on to a median horizontal conveyor 6 which is also constituted by an endless belt passing over drive rollers 7 located at either end of said belt. The belts of the superposed pair thereof, where they face one another, are so tensioned that they engage the periphery of each keg and urge the latter along the path of travel.

When a keg reaches the distal end of the median conveyor 6 and drops therefrom, it will strike a further vertical deflector 8 (similar to deflector 5) which will deflect the keg on to a lower horizontal conveyor 9 (also an endless belt) passing over drive rollers 10 located at either end of the belt 9. When each keg reaches the distal end of the lowermost conveyor 9, the keg will be transferred to metering apparatus A provided with a pivotable cradle A' and from the latter to further apparatus B forming the subject of copending application Ser. No. 713,117 and which is adapted to remove the discs therefrom.

Thereafter, the disc-less kegs are transferred to apparatus C (forming the subject of U.S. Pat. No. 3,906,610) which will remove the wooden bungs therefrom. The disc-less and de-bunged kegs are then transferred to further metering apparatus D. Both metering devices A and D serve to control the spaced feed of the kegs and thereby also serve to reduce the noise of the empty kegs passing through the keg house.

Figure 2:
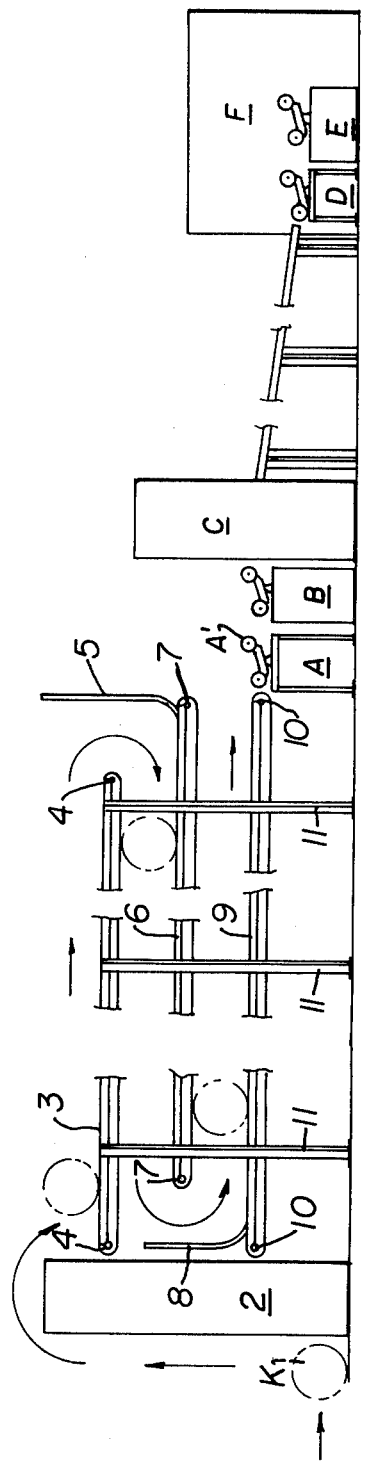
FIG. 2 is a side elevation of FIG. 1.

If required, as is the case of the example shown in FIG. 2 because of the location of the keg washing and sterilizing apparatus F, a turntable E may be provided so as to orient the kegs prior to their entry into said keg washer.

As will be appreciated, the invention need not be limited to the precise number of conveyor belts, keg metering devices or keg turntables as shown in the example in the drawings, because, obviously, these could be omitted entirely.

I claim:

1. A method of conveying empty beer kegs through one keg handling apparatus to other keg handling apparatus including the steps of:
   a. elevating each keg to the uppermost one of a plurality of superposed conveyor belts;
   b. conveying said kegs along said uppermost conveyor belt to a deflector located at the distal end thereof;
   c. conveying said kegs along the next successive belt to the terminal end thereof, the belts of each superposed pair thereof, where they face one another, being so tensioned that they engage the periphery of each keg and urge it along the path of travel; and
   d. transferring said kegs from said lowermost conveyor belt to said other keg handling apparatus, which is adapted to remove and object from one end of each keg.

2. A method of conveying empty beer kegs through one keg handling apparatus to other keg handling apparatus including the steps of:
   a. elevating each keg to the uppermost one of plurality of superposed conveyor belts;
   b. conveying said kegs along said uppermost conveyor belt to a deflector located at the distal end thereof;
   c. conveying said kegs along the next successive belt to the terminal end thereof, the belts of each superposed pair thereof, where they face one another, being so tensioned that they engage the periphery of each keg and urge it along the path of travel;
   d. transferring said kegs from said lowermost conveyor belt to said other keg handling apparatus which is adapted to remove an object from one end of each keg; and
   e. transferring said kegs from said other keg handling apparatus to further apparatus adapted to remove a bung from the side of each keg.

3. A method of conveying empty beer kegs through one keg handling apparatus to other keg handling a apparatus including the steps of:

a. elevating each keg to the uppermost one of a plurality of superposed conveyor belts;
b. conveying said kegs along said uppermost conveyor belt to a deflector located at the distal end thereof;
c. conveying said kegs along the next successive belt to the terminal end thereof, the belts of each superposed pair thereof, where they face one another, being so tensioned that they engage the periphery of each keg and urge it along the path of travel;
d. transferring said kegs from said lowermost conveyor belt to said other keg handling apparatus which is adapted to remove an object from end of each keg;
e. transferring said kegs from said other keg handling apparatus to further apparatus adapted to remove a bung from the side of each keg; and
f. transferring said kegs from said further apparatus to keg washing and sterilizing apparatus.

4. Apparatus for conveying empty beer kegs to other keg handling apparatus, including means for elevating said kegs and depositing them on the uppermost one of a plurality of superposed driven endless conveyor belts; means for deflecting said kegs from one conveyor belt to the next lowermost conveyor belt; the belts of each superposed pair thereof, where they face one another, being so tensioned that they engage the periphery of each keg and urge it along the path of travel, including apparatus located after the lowermost conveyor belt and adapted to remove an object from one end of each keg.

5. Apparatus for conveying empty beer kegs to other keg handling apparatus, including means for elevating said kegs and depositing them on the uppermost one of a plurality of superposed driven endless conveyor belts; means for deflecting said kegs from one conveyor belt to the next lowermost conveyor belt; the belts of each superposed pair thereof, where they face one another, being so tensioned that they engage the periphery of each keg and urge it along the path of travel, including apparatus located after the lowermost conveyor belt and adapted to remove an object from one end of each keg; and further apparatus located after said object-removing apparatus and adapted to remove a bung from the side of each keg prior to the latter's delivery to keg washing and sterilizing apparatus.

6. Apparatus for conveying empty beer kegs to other keg handling apparatus, including means for elevating said kegs and depositing them on the uppermost one of a plurality of superposed driven endless conveyor belts; means for deflecting said kegs from one conveyor belt to the next lowermost conveyor belt; the belts of each superposed pair thereof, where they face one another, being so tensioned that they engage the periphery of each keg and urge it along the path of travel, including apparatus located after the lowermost conveyor belt and adapted to remove an object from one end of each keg;

further apparatus located after said object-removing apparatus and adapted to remove a bung from the side of each keg prior to the latter3 s delivery to keg washing and sterilizing apparatus; and at least one keg-metering device in the path of travel of the kegs between the lowermost conveyor and the washing and sterilizing apparatus.

* * * * *